(12) United States Patent
Arrouye et al.

(10) Patent No.: US 8,122,380 B2
(45) Date of Patent: Feb. 21, 2012

(54) MULTI-REPOSITORY DISPLAY SYSTEM USING SEPARATE PRESENTATION, ADAPTATION AND ACCESS LAYERS

(75) Inventors: Yan Arrouye, Cupertino, CA (US); Sean J. Findley, Gilroy, CA (US); Keith L. Mortensen, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 686 days.

(21) Appl. No.: 10/251,925

(22) Filed: Sep. 20, 2002

(65) Prior Publication Data

US 2003/0071854 A1 Apr. 17, 2003

Related U.S. Application Data

(62) Division of application No. 09/162,125, filed on Sep. 29, 1998, now Pat. No. 6,486,897.

(51) Int. Cl.
*G06F 3/00* (2006.01)
(52) U.S. Cl. ........................................ 715/853
(58) Field of Classification Search .................. 715/734, 715/753, 853, 735, 737, 739
See application file for complete search history.

(56) References Cited

U.S. PATENT DOCUMENTS

| | | | |
|---|---|---|---|
| 4,805,134 A | 2/1989 | Calo et al. | |
| 5,410,698 A | 4/1995 | Danneels et al. | |
| 5,414,854 A | 5/1995 | Heninger et al. | |
| 5,465,362 A | 11/1995 | Orton et al. | |
| 5,537,592 A | 7/1996 | King et al. | |
| 5,544,360 A | 8/1996 | Lewak et al. | |
| 5,561,800 A | 10/1996 | Sabatella | |
| 5,564,017 A | 10/1996 | Corn et al. | |
| 5,586,317 A | 12/1996 | Smith | |
| 5,652,876 A | 7/1997 | Ashe et al. | |
| 5,671,398 A | 9/1997 | Neubauer | |
| 5,708,811 A | 1/1998 | Arendt et al. | |
| 5,758,153 A | 5/1998 | Atsatt et al. | |
| 5,796,393 A | 8/1998 | MacNaughton et al. | |
| 5,801,702 A * | 9/1998 | Dolan et al. | 715/854 |
| 5,805,886 A | 9/1998 | Skarbo et al. | |
| 5,835,089 A | 11/1998 | Skarbo et al. | |
| 5,838,972 A | 11/1998 | Matsuzuka et al. | |
| 5,900,879 A | 5/1999 | Berry et al. | |
| 5,901,315 A | 5/1999 | Edwards et al. | |
| 5,920,314 A | 7/1999 | Maesano et al. | |
| 5,953,534 A | 9/1999 | Romer et al. | |
| 5,960,204 A | 9/1999 | Yinger et al. | |
| 5,961,594 A | 10/1999 | Bouvier et al. | |
| 5,964,843 A | 10/1999 | Eisler et al. | |
| 5,999,178 A | 12/1999 | Hwang et al. | |
| 6,000,028 A | 12/1999 | Chernoff et al. | |

(Continued)

OTHER PUBLICATIONS

Bharat Bhasker, Csaba J. Egyhazy and Konstantinos P. Triantis, "The Architecture of a Heterogeneous Distributed Database Management System: The Distributed Access View Integrated Database (DAVID)", 1992, ACM Digital Library, pp. 173-179.*

(Continued)

*Primary Examiner* — Thanh Vu

(74) *Attorney, Agent, or Firm* — Buchanan Ingersoll & Rooney PC

(57) ABSTRACT

In a software object display system, an adaptation layer is used to isolate the presentation layer from expectations of the structure of the software objects displayed. A small set of data can be transferred between the adaptation layer and the presentation layer in order to provide for the display.

14 Claims, 3 Drawing Sheets

| PRESENTATION LAYER | | | | |
|---|---|---|---|---|
| ADAPTATION LAYER | | | | |
| FTP ACCESS UNIT | FILE ACCESS UNIT | DATABASE ACCESS UNIT | WEB ACCESS UNIT | NEW TYPE OBJECT ACCESS UNIT |
| FTP SOFTWARE OBJECTS | FILE SOFTWARE OBJECTS | DATABASE SOFTWARE OBJECTS | WEB PAGE SOFTWARE OBJECTS | NEW TYPE OF SOFTWARE OBJECT |

U.S. PATENT DOCUMENTS

| | | | |
|---|---|---|---|
| 6,031,528 | A | 2/2000 | Langfahl, Jr. |
| 6,032,153 | A | 2/2000 | Sadiq et al. |
| 6,054,989 | A | 4/2000 | Robertson et al. |
| 6,076,141 | A | 6/2000 | Tremblay et al. |
| 6,205,490 | B1 | 3/2001 | Karapetkov et al. |
| 6,215,489 | B1 | 4/2001 | Kaplan |
| 6,222,540 | B1 | 4/2001 | Sacerdoti |
| 6,230,310 | B1 | 5/2001 | Arrouye et al. |
| 6,314,566 | B1 | 11/2001 | Arrouye et al. |
| 6,330,239 | B1 | 12/2001 | Suzuki |
| 6,344,862 | B1 | 2/2002 | Williams et al. |
| 6,381,611 | B1 | 4/2002 | Roberge et al. |
| 6,385,662 | B1 | 5/2002 | Moon et al. |
| 6,486,897 | B1 | 11/2002 | Arrouye et al. |
| 6,532,472 | B1 | 3/2003 | Arrouye et al. |
| 6,678,724 | B2 * | 1/2004 | Nakajima et al. ............. 709/219 |

OTHER PUBLICATIONS

Bharat Paliwal, Hemalatha Diwakar and Jatin Jhala, "Loosely Coupled Multimedia Database Management System", 1997, IEEE Xplore, pp. 593-595.*

Huiwei Guan, Horace H. S. Ip and Yanchun Zhang, "Java-based Approaches for Accessing Databases on the Internet and a JDBC-ODBC Implementation", Apr. 1998, IEEE Xplore, pp. 71-78.*

Brad M. McGehee, Chris Miller and Mathew Shepker, "Teach Yourself MCSE SQL Server 6.5 Administration in 14 Days", Jun. 1998, Sams Publishing, pp. 86-108, 125-136, 153-166 and 188-191.*

Gordon, Letwin, *Inside OS/2*. Microsoft Press, 1988, pp. 89-116.

Ed Iacobucci, *OS/2 Programmer's Guide*. Osbourne McGraw-Hill, 1988, pp. 131-138.

*Inside Macintosh*, vol. I, pp. I-12, I-13, Addison-Wesley Publishing Company, Inc., 1985.

*Inside Macintosh*, vol. II, pp. II-53-II-64, Addison-Wesley Publishing Company, 1985.

PR Newswire, "*The Open Group Releases High Performance Java (™) Byte Code Compiler for HP's HP-UX Operating System*". PR Newswire, p1203NEW034, Dec. 1997.

IBM Corporation; "*Mapping Imported Symbols at Link Time to Improve Load Time on the Office Systems/2 Operating System*". IBM Technical Disclosure Bulletin, pp. 539-540, Sep. 1995.

Robert Cowart, *Mastering Windows 3.1 Special Edition*, 1993, pp. 103-145.

Robert Cowart, *Mastering Windows 3.1 Special Edition*, 1992, pp. 586-600.

Neufeld et al., "Opening Multiple Files," pp. 1-2.

Bott, Special Edition Using Windows 95 with Internet Explorer 4.0, pp. 1-7, 1997.

* cited by examiner

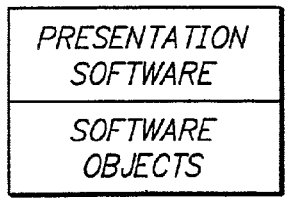
FIG. 1
*(PRIOR ART)*
| PRESENTATION LAYER | | | | |
|---|---|---|---|---|
| ADAPTATION LAYER | | | | |
| FTP ACCESS UNIT | FILE ACCESS UNIT | DATABASE ACCESS UNIT | WEB ACCESS UNIT | NEW TYPE OBJECT ACCESS UNIT |
| FTP SOFTWARE OBJECTS | FILE SOFTWARE OBJECTS | DATABASE SOFTWARE OBJECTS | WEB PAGE SOFTWARE OBJECTS | NEW TYPE OF SOFTWARE OBJECT |
FIG. 2A
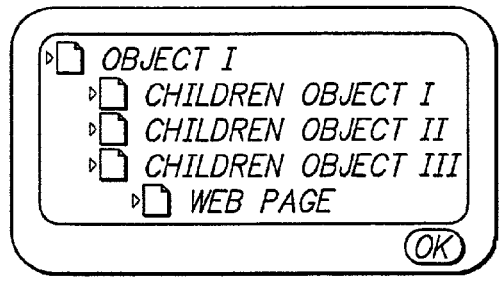
FIG. 4
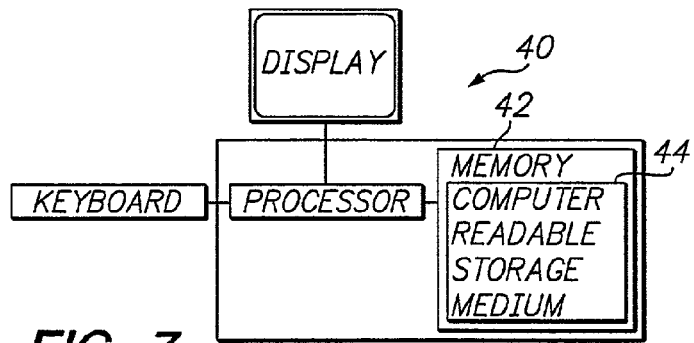
FIG. 7

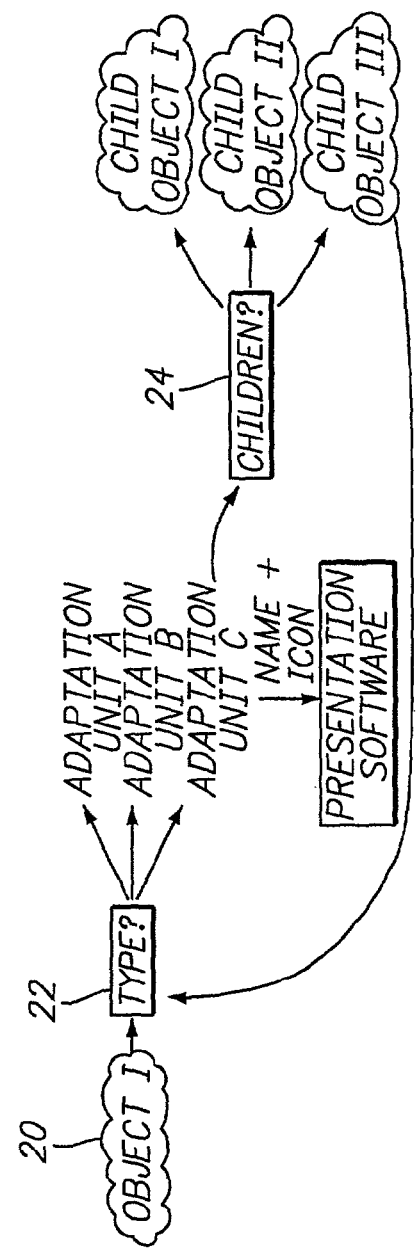

MULTI-REPOSITORY DISPLAY SYSTEM USING SEPARATE PRESENTATION, ADAPTATION AND ACCESS LAYERS

This application is a divisional of application Ser. No. 09/162,125, filed on Sep. 29, 1998 now U.S. Pat. No. 6,486,897.

RELATED APPLICATIONS

This application is related to the applications Arrouye et al., U.S. patent application Ser. No. 09/161,758, now U.S. Pat. No. 6,230,310, for "A METHOD ADAPTED TO TRANSPARENTLY TRANSFORM OBJECTS FOR AN APPLICATION PROGRAM," Arrouye et al., U.S. patent application Ser. No. 09/162,126, now U.S. Pat. No. 6,532,472, for "PERSISTENT STATE DATABASE FOR OPERATING SYSTEM SERVICES", and Arrouye et al., U.S. patent application Ser. No. 09/943,900, now U.S. Pat. No. 7,171,674, for "METHOD AND APPARATUS FOR "JUST-IN-TIME" DYNAMIC LOADING AND UNLOADING OF COMPUTER SOFTWARE LIBRARIES", which are all incorporated herein by reference.

BACKGROUND OF THE INVENTION

1. Field of the Invention

The present invention relates to software systems for providing the display and access to software objects in a computer system.

2. State of the Art

Typically, in a computer system, the files which are available for selection by different applications are displayed in a hierarchical manner. The display is part of a user interface on the file management system of the computer system. The user can select a file to be opened by clicking on a representation of the file, or performing a related operation which issues a command to open the file.

A difficulty occurs when different types of software objects are accessible. In the past, the user interface has been designed with certain, sometimes hidden, expectations of the software objects to be accessed. Most file access systems assume that the software objects are based on a single model. Typically, the local file system forms the basis for this model, since files are the most common types of software objects. When a new type of software object is introduced, it is often forced into this file system model. Some types of software objects, however, do not have a good conceptual fit with the file system model. For example, in file systems, small portions of the file can be independently accessed and modified. This type of access is not possible for some other types of software objects, such as database objects, or web pages on the Internet. For these objects, the entire software object is replaced when a change is to be made.

As another example of the differences between types of software objects, file systems are typically based upon containment relationships, where one object can have child, or dependent objects, as well as parent objects. This type of relationship may not apply to other types of objects, such as database records, or web pages, since they are not inherently hierarchical.

In the past, when a new type of software object is introduced, either the user interface software is modified to recognize and handle the new type of software object, or the new type of software object is forced into an existing model, such as the file system model. Because of hidden links between the file system model and the user interface software, modifying the interface to add a new object type can be difficult.

It is desired to have an improved system of displaying and accessing software objects that avoid some of the problems of the prior art, and facilitate access to a variety of different types of software objects.

SUMMARY OF THE PRESENT INVENTION

In accordance with the present invention, an adaptation layer is used to isolate a presentation layer of a user interface from the details of accessing the software objects. For each object to be displayed, a standard set of information is transferred to the presentation layer from the adaptation layer. This information, in one embodiment, includes the type of object (e.g. file, web page, etc.) the name and/or icon of the software object, and an indication of the presence of children objects of the software object. This data is provided by the adaptation layer which can call different access units for the different types of software objects. Thus, if there are three different types of software objects, there will be three different access software units called by the adaptation layer to get the appropriate information about the software object. Each of the access units can obtain a standard set of information from the respective types of software objects in vastly different manners. In a preferred embodiment, the amount of data required to be transferred from the adaptation layer to the presentation layer is relatively minimal. Optional information can also be transferred, including, but not limited to, the date and time of the last modification, and the object size.

An advantage of the present invention is that new types of software objects can be added without requiring modifications to the presentation layer. The presentation layer can display representations of software objects having vastly different software object types. For example, web pages, databases, file transfer protocol (FTP) objects, and regular file types can be displayed in the same hierarchical structure.

Another embodiment of the present invention concerns a hierarchical display which allows for the selection of software objects having different heterogeneous types. In one embodiment, such a system is made possible by the use of the adaptation layer. Representations of software objects of different types can be shown in the same display, and viewed and selected by the user. The selection of representations in the hierarchical display call access units to access the software objects. The presentation layer is not burdened with figuring out how to access the different software objets. The presentation layer merely sends an "open software object" signal to the different access units which can access the software objects in their own manner.

The software objects can be from a variety of different sources and repositories. These different repositories can contain heterogeneous types of objects, which would previously have been considered to be incompatible. For example, the software objects can include file objects, database objects, FTP objects, or internet web objects.

BRIEF DESCRIPTION OF THE DRAWINGS

The present invention may be further understood from the following description in conjunction with the appended drawings. In the drawings:

FIG. 1 is a diagram of a conventional software object display system.

FIG. 2A is a diagram of a software object display system of the present invention.

FIG. 2B is a diagram of an alternate embodiment of a software object display system of the present invention.

FIG. 3 is a diagram illustrating the operation of one embodiment of the software object display system of the present invention.

FIG. 4 is a diagram illustrating a display for the embodiment of FIG. 3.

FIG. 7 is a diagram of a computer system including a computer readable medium suitable for storing a program of the present invention.

DETAILED DESCRIPTION OF THE PREFERRED EMBODIMENTS

Figure 5:
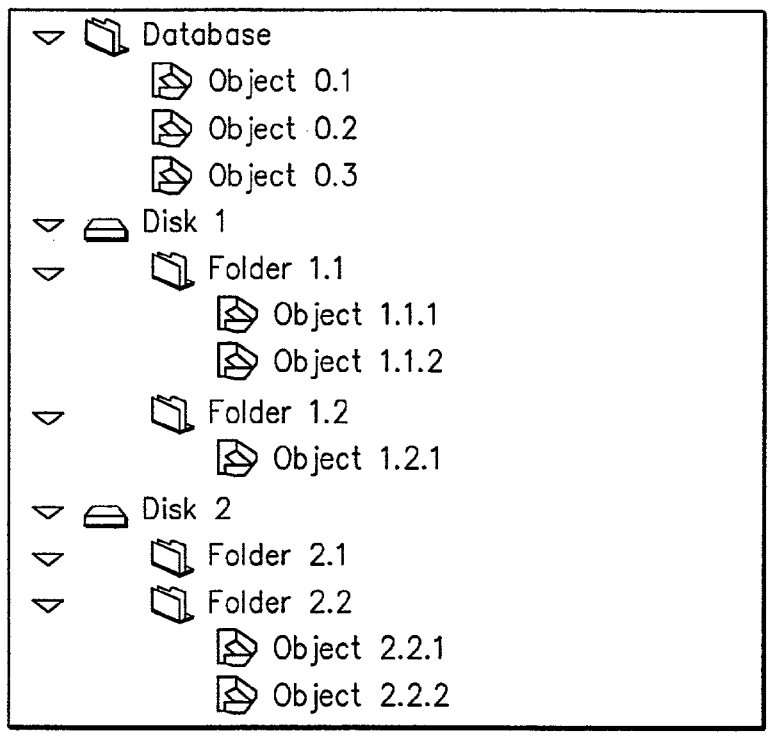
FIG. 5 is a diagram illustrating a display used with the present invention.

FIG. 1 illustrates a conventional display system with the presentation layer and software objects. The presentation layer is part of a user interface for the file management system of the computer system. The presentation layer allows the user to select a file or folder to be opened by clicking on a representation of the file or folder. The presentation layer may include application programming interfaces that allow an application program to obtain access to software objects. For instance, the application programming interfaces may provide access to open and save dialog boxes via which the user can select a particular file or other object at a designated location.

Typically, conventional presentation systems were produced with knowledge of the types of software objects to be used. Conventional presentation systems can be tightly meshed with the details of the expected software object types. Often, the presentation layer expects the software objects to behave as files. The file system model is useful for a variety of different types of software objects, such as sound files, movie files, and text files. The prevalence of the file system model has influenced software designers to force new objects into this model.

A problem occurs when a new type of software object is introduced that does not easily fit the file system model, such as an Internet web page. Modifying the presentation software to allow display of a web page is quite difficult because the presentation software was written expecting all of the software objects to behave in the same manner as a file.

FIG. 2A is a diagram illustrating one embodiment of the present invention. In this embodiment, the presentation layer is isolated from the details of the software object access by an adaptation layer. The presentation layer is designed to require only a small amount of pre-specified data to produce the display of the different software objects. The adaptation layer provides the set of required data for each software object. This set includes the name of the software object, icon data for the software object, and the existence of children objects for the software object. The required data set could even be smaller, merely providing the name and the existence of children. The presentation layer is isolated from the details of the software object access. Thus, the presentation layer does not expect the software objects to have specific characteristics, and does not require the software objects themselves to have a particular structure.

The software objects can be from a variety of different sources and repositories. These different repositories can contain heterogeneous types of objects, which would previously be considered incompatible. For example, the software objects can include file objects, database objects, and internet web objects, including FTP server objects.

The details of the software object access is provided by the adaptation layer and access units. Certain other types of information can be provided by the adaptation layer to the presentation layer, but is not required. This data can include the file size, and the time and date of the last modification. For some types of objects where this information does not make sense, it need not be transferred to the presentation layer. In a preferred embodiment, the adaptation layer is a "thin" layer of software that uses the access units to obtain the display information. The access units may be unmodified commercially available software.

The presentation layer also preferably sends signals to the lower levels in a fixed form. Thus, if the user selects a command to open a software object, an "open object" instruction is sent to the lower levels which interpret this instruction to open the software object in its own fashion.

As shown in FIG. 2A, a variety of different software objects can be simultaneously accessed with the present invention. The different types of objects might be stored on different respective repositories. Thus, file objects might be stored on a local disk drive, FTP objects can be stored at a remote FTP site, and database objects are accessed via a separate database server. Access units for file objects, database objects, and web objects are shown. It is easy to support new types of software objects. The adaptation layer can be changed and additional access units added. Since the presentation layer only expects certain fixed data, the new object types can be added without modifying the presentation layer.

In a preferred embodiment, the presentation layer does not require the identifying data to be returned within a fixed time period. With a file system, when data is requested by the presentation unit, the computer system can quickly obtain this data. A presentation layer that expects the objects to conform to a file system model may require that data be received within a certain amount of time. For example, the system could time out after a short period if the data is not obtained by the presentation layer. However, in the preferred embodiment of the present invention, the presentation layer does not have any expectations of when the identification data is to be presented. The presentation layer requests data a few times, and can produce a display whenever the data is sent from the lower levels. The presentation layer does not have any expectations as to when this data is to be received.

This feature is particularly advantageous when web objects are accessed. Since Internet access is typically much slower than access over the computer system files, the timing out of the system can cause problems. In other embodiments, a time limit may be set.

Different access units can obtain the required data from the objects in vastly different manners. The presentation layer has no expectations of how this data is to be produced. For a file unit access, the data can be obtained in the conventional manner. For a web access system, the system can search for text to use as the name of the object, either from the web page or the web page's uniform resource locator (URL), and can go through the web page to identify URLs contained within it to produce an indication of the children objects of that web page. An access unit for a database can use the details of the database structure to produce the name and links to any children objects. The adaptation layer is preferably quite thin and merely an intermediary between the presentation layer and the different software object access units.

The access units can also provide different ways of manipulating the software objects as a result of instructions from the presentation layer. For example, if the user selects "open a file", this instruction is interpreted as appropriate by each of the different access units, to retrieve a file.

An access unit may be able to access more than one type of object. Additionally, a single type of object can be accessed by more than one access unit.

FIG. 2B illustrates an alternate embodiment in which the adaptation layer is comprised of a number of adaptation units corresponding to the access units.

FIG. 3 illustrates the operation of the adaptation layer. Consider object I. The type of object I is checked in block 22. The type of the object can be indicated by a type field for the object; based upon the object's parent; by having the access layer and access units interpret the object, or any other suitable manner. In this example, adaptation layer unit C recognizes the object I, and the name and icon information for the object I is sent to the presentation software. In block 24, it is checked whether object I has any children objects. When children objects are found, the name icon and children status of the objects are checked. Once the parent-child relationships between objects are established, the presentation layer might display, at the top of its hierarchy, all of the top-level nodes for containers that can be accessed.

Figure 6:
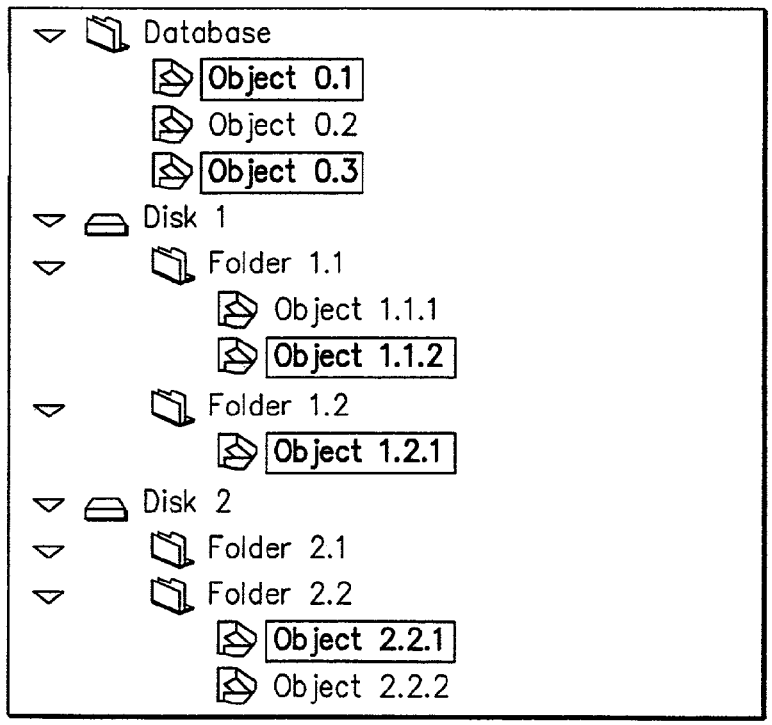
FIG. 6 is a diagram illustrating the selection of different software objects in the display of FIG. 5.

FIG. 4 is a diagram illustrating the example of FIG. 3. When object I, which is a file, is opened, the system finds the names, icons, and children status for the three children objects: child object I, child object II, and child object III. When one of these children objects, such as child object III, are selected, data on the child is received and displayed by the display. In this example, a web page is a child of the child object III. Note, this is an entirely different type of object from the child object III, but it is displayed in the same manner as any other type of software object. In FIGS. 4-6, the names given to the different objects are for illustrative purposes; actual object names of the software objects typically do not indicate the type of objects.

FIG. 5 is a diagram illustrating the display of an embodiment of the present invention. Note that in FIG. 5, software objects from different heterogeneous repositories are shown. For example, data from database records, and from files on the computer system are shown in the same hierarchical display. This is made easier by the use of the adaptation layer of the present invention, since the presentation layer has no expectations about the software object other than the existence of a name. Thus, displays of objects from heterogeneous repositories are allowed, even when the objects are of different, non-compatible types.

FIG. 6 illustrates a diagram of the display of FIG. 5 in which different objects are selected. In a preferred embodiment of the present invention, different objects of heterogeneous file types can be selected at the same time. The presentation layer makes no assumptions about the types of software objects, and can thus allow the display of a wide range of software objects. When the software objects are selected, the different access units are called to bring up the objects for the application or applications to process. An "open file" instruction from the presentation layer is interpreted by the access units in their own way to open the software objects and supply them to an application program. In one embodiment in the present invention, some of the objects may be transformed for use in a specific application as described in Arrouye, et al., U.S. patent application Ser. No. 09/161,758, now U.S. Pat. No. 6,230,310, entitled, "A METHOD ADAPTED TO TRANSPARENTLY TRANSFORM OBJECTS FOR AN APPLICATION PROGRAM," which is incorporated by reference.

FIG. 7 is a diagram that shows a computer system 40 including a memory 42 with access to the computer readable medium 44 of a program to run the methods of the present invention. The computer readable medium can be Read Only Memory, Random Access Memory, Compact Disc, diskette or any other type of medium from which the programs of the present invention can be read.

It will be appreciated by those of ordinary skill in the art that the present invention can be embodied in other specific forms without departing from the spirit or essential character thereof. The presently disclosed embodiments are therefore considered in all respects to be illustrative and not restrictive. The scope of the invention is indicated by the appended claims, rather than the foregoing description, and all changes which come within the meaning and range of equivalence thereof are intended to be embraced therein.

The invention claimed is:

1. A computer system including:
a plurality of repositories containing a variety of different types of software objects;
a plurality of access units associated with said repositories to retrieve software objects from the repositories in accordance with the respective characteristics of the different types of software objects;
an adaptation layer operably connected to the access units wherein the adaptation layer obtains information about the software objects and their children objects from the access units, and based on the information obtained from the access units, provides a standard set of object-based information common to each software object of the different respective type, including at least the name of the software object, the type of the software object, and information on whether there are any children objects of the software object; and
presentation software operably connected to the adaptation layer, the presentation software being capable of constructing hierarchical display representations of software objects of different types based on the standard set of object-based information received from the adaptation layer, wherein the hierarchical display representations comprise an indication of at least the respective names of the software objects, the respective types of the software objects, and the presence of any children objects of the software objects.

2. The computer system of claim 1, wherein the presentation software includes a user interface.

3. The computer system of claim 2, wherein the presentation software includes a user interface that is configured to open a retrieved software object.

4. The computer system of claim 2, wherein the presentation software includes a user dialog interface to select a software object.

5. The computer system of claim 1, wherein the information provided by the adaptation layer further includes a software object icon.

6. The computer system of claim 1, wherein the presentation software is such that access units can be added without modifying the presentation software.

7. A non-transitory computer-readable medium containing the following program modules:
a plurality of access units that function to retrieve different respective types of software objects from repositories in accordance with the respective characteristics of the different types of software objects;
an adaptation layer operably connected to the access units, for obtaining information about the software objects and their children objects from the access units, the adaptation layer providing, based on the information obtained from the access units, a standard set of object-based information common to each software object of the different respective type, including at least the name of the software object, the type of the software object, and information on whether there are any children objects of the software object; and a presentation layer for constructing a hierarchical display representation of software objects of different types based on the object-based information received from the adaptation layer, wherein the hierarchical display representations comprise an indication of at least the respective names of the software objects, the respective types of the software objects, and the presence of any children objects of the software objects.

8. The non-transitory computer-readable medium of claim 7, wherein the produced hierarchical display representation of software objects of different types is based on a user interface.

9. The non-transitory computer-readable medium of claim 8, wherein the user interface is configured to open a retrieved object.

10. The non-transitory computer-readable medium of claim 8, wherein the produced hierarchical display representation of software objects of different types includes a user dialog interface to select a software object.

11. The non-transitory computer-readable medium of claim 7, wherein the adaptation layer provides a software object icon to the presentation software to represent a retrieved software object.

12. The non-transitory computer-readable medium of claim 7, wherein the presentation layer is such that access units can be added without modifying the presentation layer.

13. A computer system including:
a plurality of repositories containing a variety of different types of software objects chosen from a group comprising file objects, database objects, internet web objects, and FTP server objects;
a plurality of access units associated with said repositories to retrieve software objects from the repositories in accordance with the respective characteristics of the different types of software objects;
an adaptation layer operably connected to the plurality of access units, to obtain information about the software objects from the access units, the adaptation layer providing, based on the information obtained from the access units, a standard set of display information common to each software object of the different respective type, including at least the name of the software object, the type of the software object, and information on whether there are any children objects of the software object; and
presentation software operably connected to the adaptation layer, the presentation software being capable of constructing hierarchical display representations of the software objects of different types using the display information received from the adaptation layer, wherein the hierarchical display representations comprise an indication of at least the respective names of the software objects, the respective types of the software objects, and the presence of any children objects of the software objects.

14. The computer system of claim 13, wherein the adaptation layer provides to the presentation software the display information, including a software object size, and time and date of last modification of the software object.

* * * * *